US011644275B2

(12) United States Patent
Kennedy

(10) Patent No.: US 11,644,275 B2
(45) Date of Patent: May 9, 2023

(54) VOLUMETRIC LED ALIGNMENT AID FOR SIGHTING DEVICE

(71) Applicant: Jordan Kristomas Kennedy, Chandler, AZ (US)

(72) Inventor: Jordan Kristomas Kennedy, Chandler, AZ (US)

( * ) Notice: Subject to any disclaimer, the term of this patent is extended or adjusted under 35 U.S.C. 154(b) by 273 days.

(21) Appl. No.: 16/858,409

(22) Filed: Apr. 24, 2020

(65) Prior Publication Data

US 2021/0333067 A1    Oct. 28, 2021

(51) Int. Cl.
| | |
|---|---|
| *F41G 1/30* | (2006.01) |
| *F41G 1/34* | (2006.01) |
| *G02B 23/06* | (2006.01) |
| *G02B 23/00* | (2006.01) |
| *F21V 9/08* | (2018.01) |
| *F21Y 113/17* | (2016.01) |
| *F21Y 115/10* | (2016.01) |

(52) U.S. Cl.
CPC ............... *F41G 1/30* (2013.01); *F21V 9/08* (2013.01); *F41G 1/345* (2013.01); *G02B 23/00* (2013.01); *G02B 23/06* (2013.01); *F21Y 2113/17* (2016.08); *F21Y 2115/10* (2016.08)

(58) Field of Classification Search
None
See application file for complete search history.

(56) References Cited

U.S. PATENT DOCUMENTS

| 4,745,698 | A | * | 5/1988 | Schwulst | F41G 1/32 |
| | | | | | 42/144 |
| 5,205,044 | A | * | 4/1993 | DePaoli | F41G 1/30 |
| | | | | | 42/144 |
| 5,440,387 | A | * | 8/1995 | Montelin | G02B 23/105 |
| | | | | | 42/113 |
| 6,321,479 | B1 | * | 11/2001 | Sheehan | F41G 1/08 |
| | | | | | 42/111 |
| 6,327,806 | B1 | * | 12/2001 | Paige | F41G 1/30 |
| | | | | | 42/130 |
| 6,604,315 | B1 | | 8/2003 | Smith et al. | |
| 7,185,455 | B2 | | 3/2007 | Zaderey | |
| 7,234,265 | B1 | | 6/2007 | Cheng et al. | |
| 7,328,531 | B2 | | 2/2008 | Dietz | |
| 7,832,138 | B1 | | 11/2010 | Price | |
| 8,245,433 | B1 | | 8/2012 | Smith | |
| 8,393,109 | B2 | | 3/2013 | Gilmore | |
| 10,117,603 | B2 | | 11/2018 | Stevens et al. | |

(Continued)

*Primary Examiner* — Derek S. Chapel
(74) *Attorney, Agent, or Firm* — Lisa Foundation Patent Law Clinic

(57) ABSTRACT

An apparatus and method of manufacturing a sighting device mountable to a gun to assist a shooter in aiming at a target. The apparatus comprises an optical element and a light source which provide feedback to the user regarding alignment with a target. The alignment aid optical element is a ring of transparent material with a user-facing, contoured surface with an inner and outer edge. The contoured surface is coated with a reflective material that reflects a narrow band of light wavelengths. The apparatus further comprises a light source coupled to a mount located at a focal point of the lens wherein the emission of light from the light source faces the lens. The wavelengths emitted from the light source correspond to those of the coatings on the lens.

19 Claims, 9 Drawing Sheets

(56) References Cited

U.S. PATENT DOCUMENTS

| | | | |
|---|---|---|---|
| 2013/0141693 A1* | 6/2013 | McCabe | B29C 45/14819 |
| | | | 351/159.56 |
| 2015/0059225 A1* | 3/2015 | Huang | F41G 1/30 |
| | | | 42/113 |
| 2018/0128574 A1* | 5/2018 | Crispin | G02B 23/105 |
| 2020/0025518 A1* | 1/2020 | Nackel | F41G 1/30 |
| 2020/0271419 A1* | 8/2020 | Grace | F41G 1/30 |
| 2021/0207926 A1* | 7/2021 | Mikroulis | F41G 1/30 |

* cited by examiner

VOLUMETRIC LED ALIGNMENT AID FOR SIGHTING DEVICE

BACKGROUND

1. Field of the Invention

This invention relates generally to sighting devices and aids for small firearms, and, more particularly, aiding a shooter in quickly repositioning the aiming eye to the valid aiming zone of a red dot, or functionally similar, sighting device.

2. Description of Related Art

Generally, sighting devices for single-slug firearms (e.g. handguns) are optimized for improving precision and accuracy, while multi-pellet firearms (e.g. shotguns) are optimized for speed of target acquisition.

Historically, sighting device aids for positioning the aiming eye to the valid aiming axis—roughly characterized as "where I see now, looking through the device, is where the bullet will go,"—have iteratively improved the breadth of capability.

Early aids included simple "bead sight" device consisting of small spherical point. Absent gross misalignment of the aiming eye with the sighting device, there is no gauge of alignment accuracy in terms of either elevation (translation up and down) or azimuth (translation left or right), since the bead appears effectively identical from any reasonable deviation out of perfect alignment of the bead and aiming axis. Existing designs of this type in which the visual aid (bead) guides the aiming eye to the point where the sighting device longitudinal axis which is centered on, and collinear with, the firearm barrel longitudinal axis, can be characterized as a "zero-axis" aid. These "zero-axis" aids suffer from the inability to readily inform the user that his aiming eye is misaligned (in elevation, azimuth, or combinations thereof) with the sighting device longitudinal axis, let alone provide information on how to quickly return to alignment.

The next evolution in capability occurred with the invention of "two-axis" aids. A notable example is the "iron sight", where two posts mounted near the aiming eye—with a gap in between—are visually aligned with a single post mounted towards the end of the firearm, so as to fill the gap. This methodology is generically described as the use of two-dimensional geometric shapes which are visually misaligned, mis-colored, or mis-patterned to guide the aiming eye to: (1) the sighting device longitudinal axis; and (2) a plane orthogonal to the sighting device longitudinal axis. The advantage of the "two-axis" compared to the "zero-axis" aid is the added capability of informing the user where and how to realign his aiming eye for any combination of deviations in the up, down, left, or right directions.

A significant limitation of the "two-axis" aid is the requirement to maintain the aiming eye to a single aiming axis. An incremental improvement over the "two-axis" aid is a "red dot" sighting device which aligns the aiming eye to a multitude of aiming axes contained within an aiming volume.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Pat. No. 10,117,603 of Stevens et al. describes a low-cost, easy-to-use alignment target generator for aligning a user's own face or eye to a camera or scanner. The generator contains an optical train that alters light from a light source so that the user sees one color in the aligned eye position and another pattern or color when the eye is positioned beyond a threshold level.

U.S. Pat. No. 8,393,109 of Gilmore describes a combination red dot sight (reflex sight) and electronic range indicator displayed in a sighting element. These components are housed in a single body which includes lens elements and a light source for the red dot sight as well as an optical display for the range indicator.

U.S. Pat. No. 7,832,138 of Price describes a gun sighting system comprised of visual references hick are exact points in space that are designed to be visually touched or indexed with each other and a target for providing a "touch the points, pull the trigger" system. This system substantially eliminates mental estimation or guessing as to when alignment is present—an improvement over traditional "iron sights." The front and rear sights may utilize bright/contrasting colors to heighten visual tracking by peripheral vision of a user, drawing focal vision to the area of finest detail or exact points in space.

U.S. Pat. No. 7,328,531 of Dietz describes an apparatus configured to be attached to a gun barrel of a firearm helping to aim at a moving target, including different sized sight indicators, printed or embossed lines, icons, tinted shapes on transparent substrate, wire-like structures, or anti-reflective coatings. This apparatus is particularly useful for firing accurately at targets displaced from the longitudinal axis of the gun barrel.

U.S. Pat. No. 7,234,265 of Cheng et al. describes an internal red dot sight including: an objective lens formed of a convex lens, a planar eye lens set in a tilt angle relative to the objective lens and facing the concave surface of the objective lens, and a light emitting device set in between the planar eye lens and the objective lens and controlled to emit a point light source onto the eye lens for enabling the eye lens to reflect the point light source and to further produce a virtual point light source on the focal point of the objective lens for viewing by the user. This invention represents an iteration of the standard red dot sight which does not utilize two reflections of the LED source prior to reaching the user's eye.

U.S. Pat. No. 7,185,455 of Zaderey describes a reticle for a projectile weapon aiming device, such as a riflescope, including a primary horizontal sight line that intersects a primary vertical sight line to define a primary aiming point (cross-hair). A circle is centered on the primary aiming point to intersect the primary horizontal and vertical sight lines. The circle may facilitate quick target acquisition in rapid fire engagements.

U.S. Pat. No. 8,245,433 of Smith and U.S. Pat. No. 6,604,315 of Smith et al. describe apparatuses for assisting a shooter in holding an aiming eye at a predetermined proper level relative to the barrel of a shotgun. Such apparatuses forming a visual display, and means for presenting the display to the aiming eye along a path that extends at a predetermined rearward angle over the barrel such that—at a predetermined longitudinal position of the aiming eye— the path is at a proper level for the aiming eye to be held lightly to the barrel, so that in response to being lifted above the path, the aiming eye sees a change in the image that provides a visual indication that the aiming eye has been raised above the proper level relative to the barrel. The preferred embodiment of U.S. Pat. No. 6,604,315 comprises a light source for mounting at a front sight of the shotgun so as to project a beam of light, and a refractive surface so as to reflect and diffuse the beam into at least two different colors. The preferred embodiment of U.S. Pat. No. 8,245,433 utilizes a series of "blinders" which appear at various states of misalignment to warn the user that his aiming eye is out of alignment. These patents represent more sophisticated "two-axis" aids.

U.S. Pat. No. 6,327,806 of Paige describes an optical device for aiming at a target wherein an optical element of the optical device has a surface that reflects a source of light to create a sighting image for alignment with the target. The optical element has a spherical surface to minimize aberrations of the target. This patent represents a general handgun sighting device, without aids.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicants) will amend the specification to expressly recite the essential material that is incorporated by reference as allowed by the applicable rules.

SUMMARY

The present invention provides among other things a volumetric LED alignment aid for an optical sighting device. The implementation of a true volumetric aiming aid addresses the inherent ineffectiveness of "two-axis" aids to allow for more than one valid aiming axis. When used with a volumetric aiming device such as a "red dot", the "two-axis" aids would incorrectly indicate misalignment for all valid collinear aiming axes not coincident with the sighting device aiming axis.

The present invention provides visual guidance to the user for: (1) maintaining proper orientation of his aiming eye within a defined aiming volume—the interior area of the shape enclosed by the outer perimeter of the alignment aid, orthogonal to the aiming axis, extended forward and rearward along the longitudinal sighting device axis—corresponding to a spatial volume—the particular volume of space projected by the sighting device to the user's eye when the longitudinal sighting device axis is aligned to any particular three-axis coordinate in space—or, (2) rapidly reacquiring such orientation via a visual indicator, whose properties and appearance passively adjust to provide an indication of misalignment direction and magnitude, when an alignment deviation—defined as any combination of translational or rotational displacement in three mutually orthogonal axes—causes his aiming eye to exit the defined aiming volume.

In one embodiment, the invention comprises a frame housing coupled to a disk optical element. The disk optical element comprises a spherical shape with a concave surface comprising an inner surface, an outer surface, and an outer edge. The concave surface corresponds to a collimating contour region. The outer edge of the concave surface comprises a curvature that is less than that of a curvature of the concave surface and corresponds to a non-collimating contour region. There is an interface between the concave surface and the outer edge of the concave surface so that there is a space between the different curvatures. A first and a second coating are disposed on the collimating contour and non-collimating contour, respectively. A light source coupled to a mount located at a focal point of the disk optical element wherein the emission of light from the light source faces the disk optical element.

The disk optical element may be spherical. The disk optical element may also be parabolic. The disk optical element may also comprise a ring with an opening in the center.

In one embodiment, the first and second coatings comprise a first and second dielectric film, respectively. In some embodiments, these coatings are different. In another embodiment, the coatings are the same but the second coating is patterned. In another embodiment, the outer surface of the disk optical element comprises a ring such that the inner surface is a center opening of the ring, and the outer edge is the ring. In this embodiment, only one coating is needed as no coating is applied to the opening in the ring.

In some embodiments, a third coating is disposed on the outer surface of the disk optical element. The third coating may comprise an anti-reflective material.

In some embodiments, the light source comprises a dual wavelength LED. In this embodiment, the dual wavelengths of the LED match a first and second narrow band of light wavelengths from the first and second dielectric films, respectively. In another embodiment, the light source comprises two single wavelength LEDs. In this embodiment, the wavelengths of a first LED match a first narrow band of light wavelengths from the first dielectric film and the wavelengths of a second LED match a second narrow band of light wavelengths from the second dielectric film. In another embodiment, the light source comprises a fiber optic light collector. In the embodiment in which the disk optical element comprises the ring design, only a single wavelength light source is required.

In some embodiments, the first dielectric coating reflects a first narrow band of light wavelengths between 560 nm and 520 nm and the second dielectric coating reflects a second narrow band of light wavelengths between 700 nm and 635 nm such that the collimating regions correspond with red and green feedback from the light source.

In some embodiments, the alignment aid optical element is a ring of transparent material with the critical feature consisting of a user-facing, contoured surface—coated with a reflective material that reflects a narrow band of light wavelengths—with an inner and outer edge. To properly explain the functionality, it should be noted that the longitudinal sighting device axis is: (1) collinear with a reference axis ("aiming axis") passing through the center of the ring; and, (2) orthogonal to a reference plane that is coplanar with the ring's circular the inner edge diameter. This coplanar reference plane is divided into two regions: (1) aiming area, within the inner edge diameter; and (2) non-aiming area, outside the inner edge diameter. The ring is mounted into a body which has a cylindrical portion to house it and an offset, small-cross-section post extending from the body's user-facing cylindrical surface towards the user. A single LED—which emits the same narrow band of light wavelengths as those reflected by the ring surface coating—is mounted to a modified section of the post, such that the user cannot see the light from the LED directly.

Each light wave/particle emitted from the LED reflects off the user-facing, contoured ring surface at a unique reflection point, generating a corresponding reflected light ray for each reflection point. The reflected light rays originating at reflection points at the contoured surface inner edge travel collinearly with the aiming axis towards the user's aiming eye ("collimating"). At points of reflection outside the inner edge moving towards the outer edge, the reflected light rays diverge from a path parallel to the aiming axis by a divergence angle—directed away from the aiming axis ("non-collimating")—which increases as the reflection point approaches the outer edge of the contoured surface. The shape of the contour itself is constructed based on the reference plane at each point of reflection ("reflective surface plane"), being orthogonal to the vector that bifurcates the angle created by the light particle path from the LED to a given reflection point and the path of the reflected light ray originating from that reflection point.

The material of the optical element can be, but is not limited to, glass or plastic, including opaque materials. The shape of the optical element, from the aiming eye view, can be, but is not limited to, a: circle, semi-circle, rectangle, other geometric shapes. For the ring hoop itself—leaving aside the contoured surface—there is no hard requirement on the number of additional surfaces, therefore at a minimum there could be one target-facing surface that completes the hoop from the inner to the outer edges of the user-facing contoured surface, compared to the three additional surfaces found in a "hollow cylinder"-style ring. In addition to shape, the quantity of optical elements can be increased by modularly assembling a larger number of smaller individual elements, having the same performance capability as an equivalent monolithic element.

In another embodiment, the empty cylindrical volume of the "hollow cylinder", ring-shaped optical element is filled in, creating the appearance of a regular cylinder, albeit with a contoured, non-collimating surface between the inner and outer edges, or more accurately described as a disk. The new surface—inside the inner edge—is contoured so that the reflected light rays from this surface are always collimating. The new surface is also coated with a reflective material that reflects a second narrow band of light wavelengths, entirely distinct from the wavelengths used on the non-collimating surface. Finally, the LED is modified to emit a second narrow band of light wavelengths corresponding to the reflective material coating the new collimating surface.

The same permutations described for the "hollow cylinder" are applicable to the disk optical element.

As an alternative to using two distinct reflective coatings on the collimating and non-collimating surfaces of the disk optical element, the same coating can be used on both surfaces with different and distinct patterns of application.

As an alternative to using a LED that emits two distinct bands of light wavelengths, two separate LEDs—each emitting a single distinct band—can be mounted in two locations.

As another alternative light source, a fiber optic light collector may be used.

The material of the body can be, but is not limited to, aluminum, steel, or plastic.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]") without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
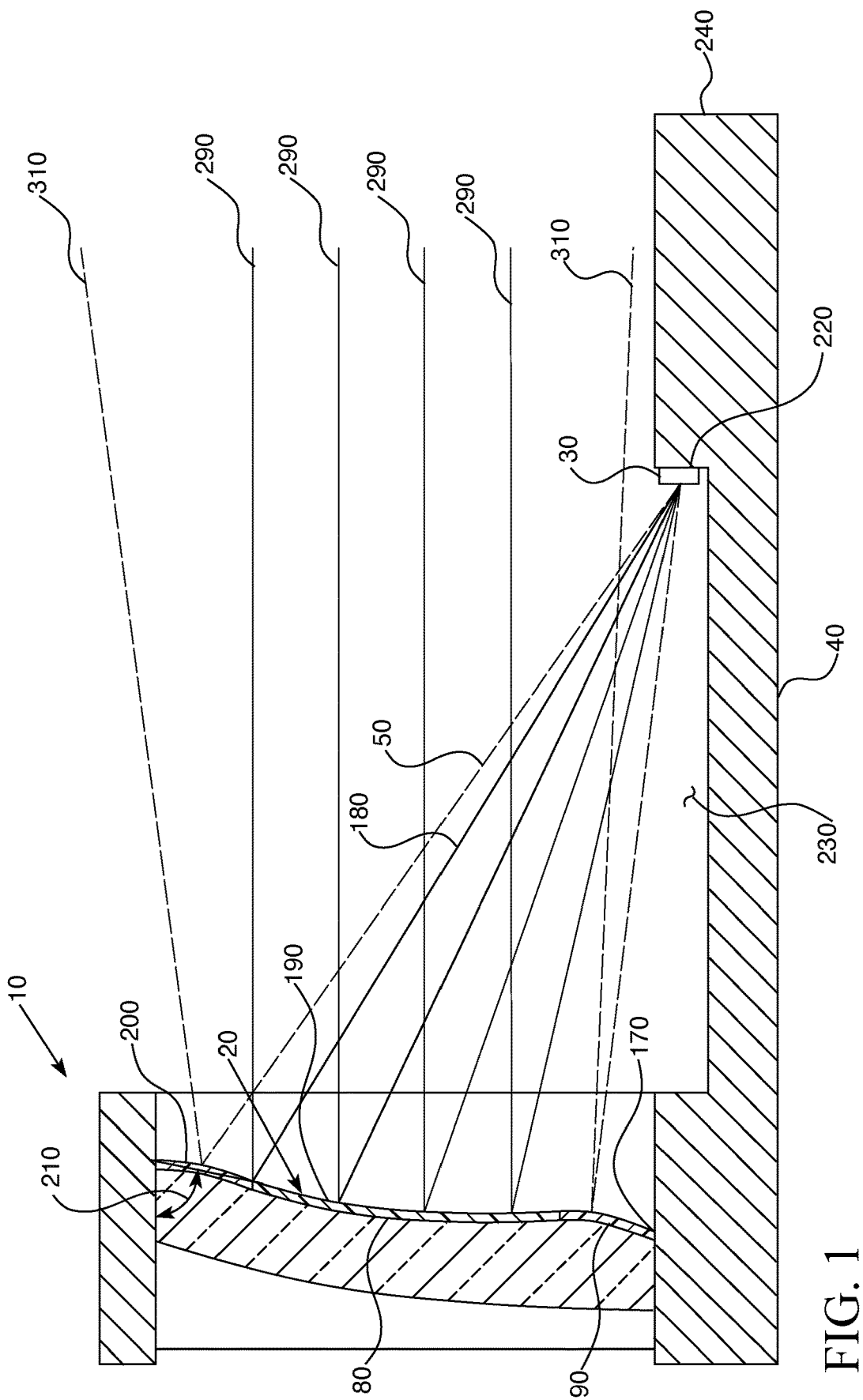
FIG. 1 depicts a cross-sectional side view of a light source and optical element of a sighting device with a collimating contoured surface and a non-collimating contoured surface outside the inner edge.
Figure 3:
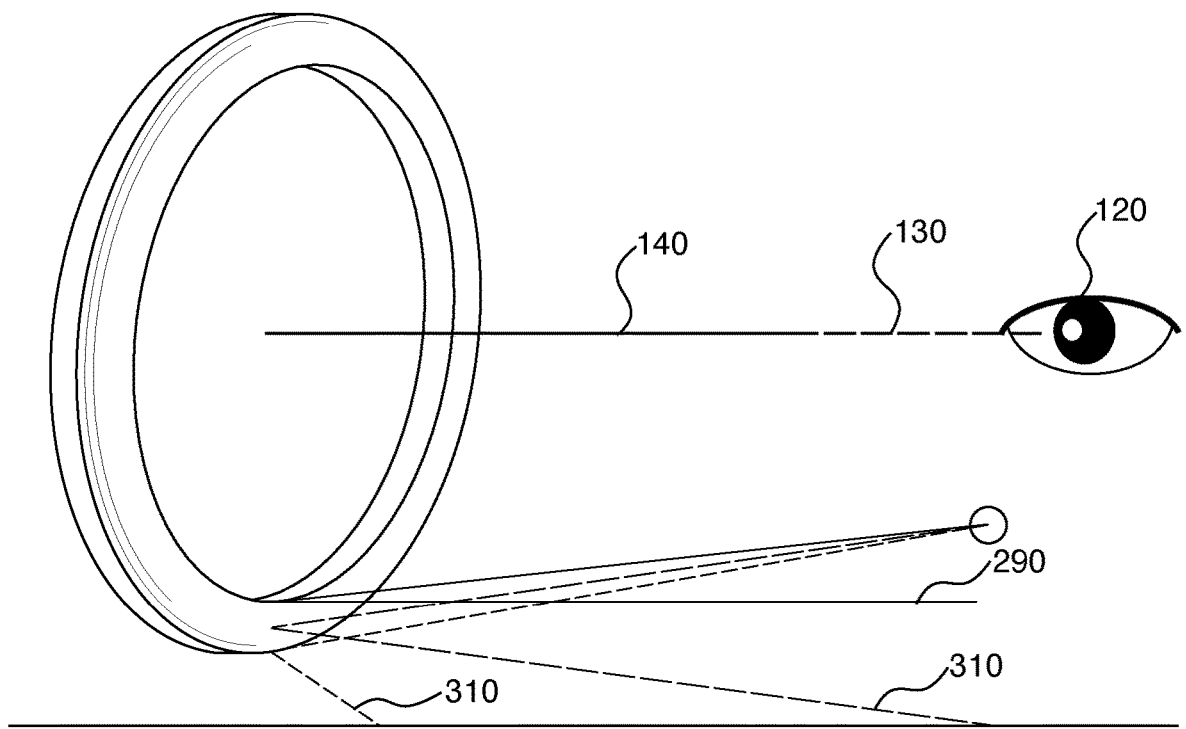
FIG. 3 depicts an isometric view of the non-collimating portion of the optical element present generally present in the anticipated embodiments of the invention.
Figure 5:
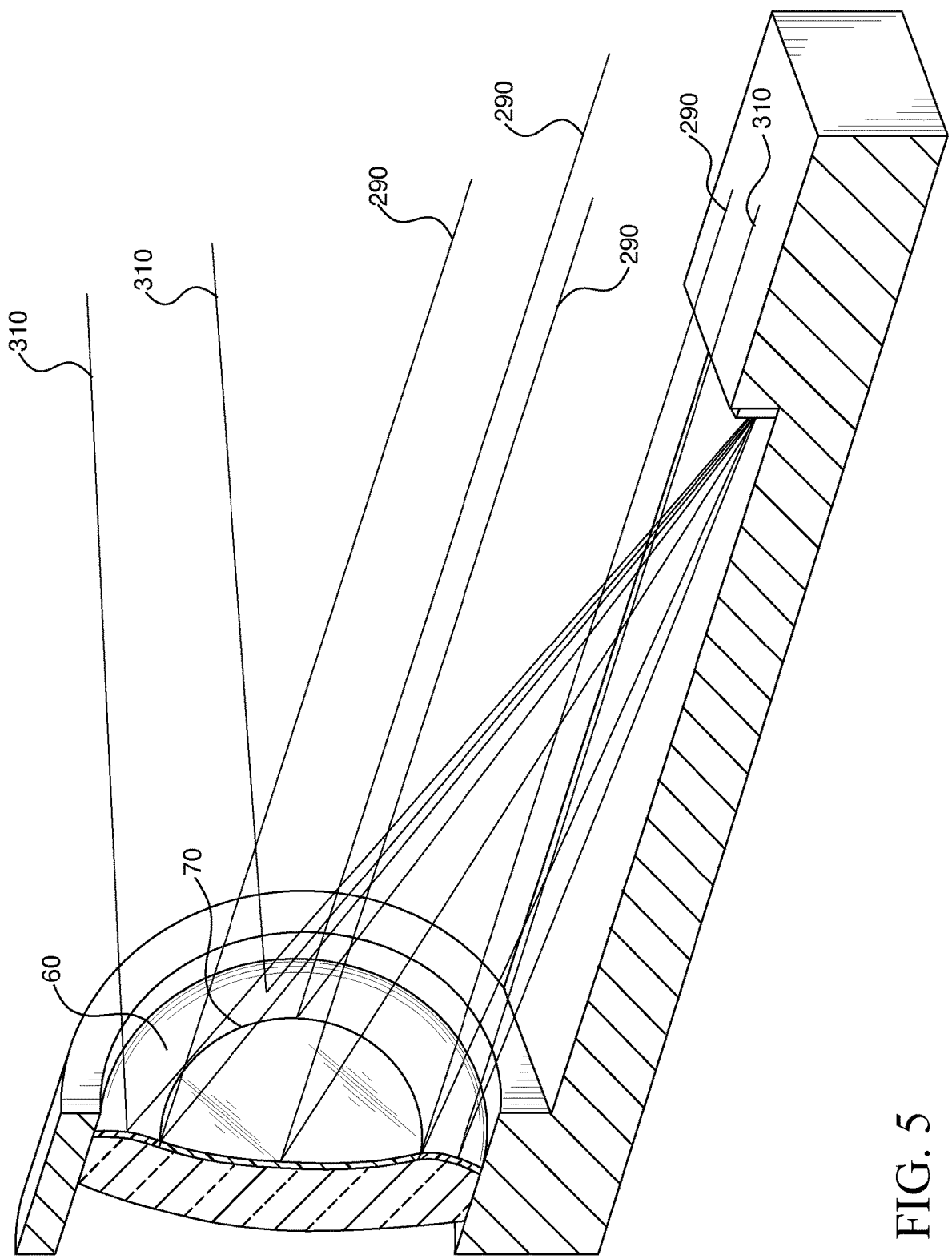
FIG. 5 depicts an isometric cross-section of a sighting device with a round optical element.

FIG. 1 and FIG. 5 shows an apparatus for assisting a shooter in holding an aiming eye within an aiming volume 10 in accordance with the present invention, having a disk optical element 20 and a light source 30 affixed to a body 40 so that a first incident light ray 50 and a second incident light ray 180 with distinct wavelengths produced by the light source 30 are aimed at the disk optical element 20. In one embodiment, the light source 30 comprises a single dual wavelength LED. FIG. 3 depicts the orientation of the user's aiming eye 120 aligned to an aiming axis 130 that is collinear with the longitudinal axis 140 passing through the center of disk optical element 20.

In an embodiment with a single light source 30, the light source 30 is a dual wavelength LED. In another embodiment with a single light source 30, the light source 30 is a fiber optic light collector.

The disk optical element 20 is formed by grinding an optical material. In some embodiments, the disk optical element 20 comprises a concave surface 80 formed by grinding an optical material. The disk optical element 20 further comprises an outer edge 90 of the concave surface 80 with a curvature less than that of the concave surface 80. There is an interface between the concave surface and outer edge 90 of which there is no reduction of curvature. In some embodiments, the disk optical element 20 is spherical. The disk optical element 20 may also be parabolic or rectangular.

Figure 2:
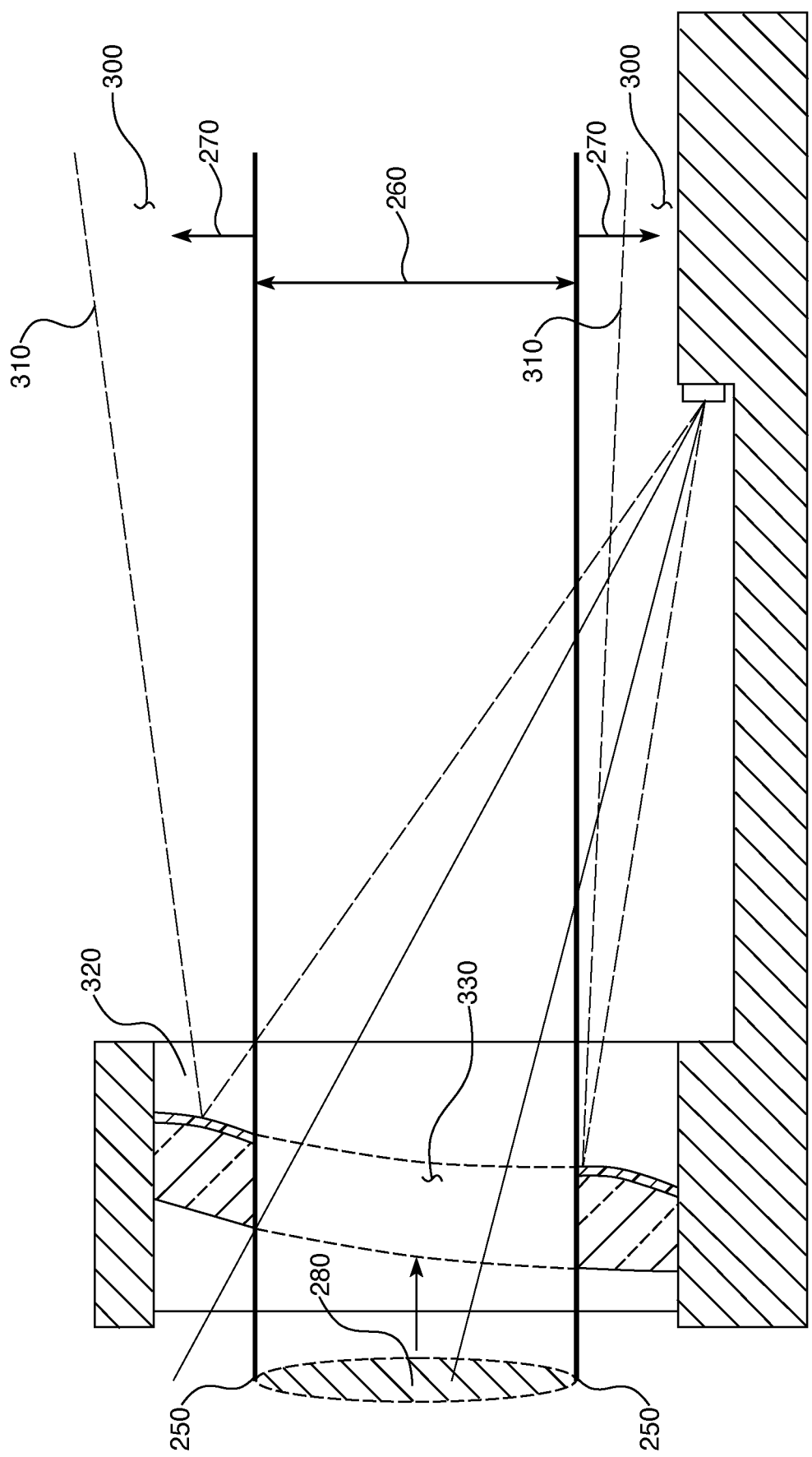
FIG. 2 depicts a cross-sectional side view of a sighting device with a ring optical element.
Figure 4:
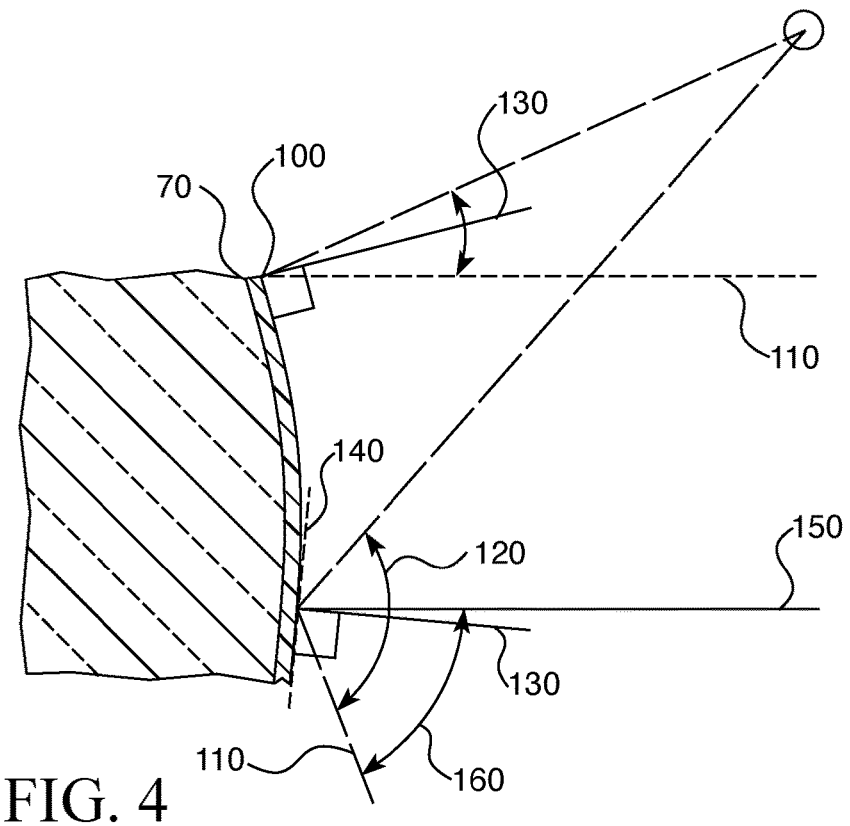
FIG. 4 depicts a radial cross-section of the hoop of the ring optical element.

The disk optical element 20 has a user-facing surface 60 with a transition line 70 separating regions of the surface with a concave surface 80 forming a collimating contour and an outer edge 90 forming a non-collimating contour, as well as a user-facing edge 170. As depicted in FIG. 2, the transition line 70 also forms an aiming boundary 250 between the aiming area 260 and the non-aiming area 270, both the aiming area and non-aiming are oriented orthogonal to the longitudinal axis 140. As shown in FIG. 4, as incident light rays 50 impinge on the user-facing surface 60 at a reflection point 100, the incident light rays reflect off the user-facing surface 60 as a reflection line 110. At any reflection point 100 the reflection 110 will have a reflection angle 120 that is bisected by a bifurcation line 130 orthogonal to a reflection plane 140 that is tangent to the user facing surface 60 at the reflection point 100.

As depicted in FIG. 4, in the concave surface (collimating contour) 80 and at the transition line 70, the reflection line 110 is oriented collinearly to a reference line 150 that is collinear to the aiming axis 130 and aimed towards the user's aiming eye 120. In the outer edge (non-collimating contour) 90, the reflection line 110 is aimed towards the user's aiming eye 120 at a divergence angle 160 to the reference line 150 which starts at 0° at the transition line 70 and increases to a maximum value at the user-facing edge 170.

In an embodiment shown in FIG. 1 and FIG. 5, the concave surface 80 is covered by a first coating 190, typically comprised of a layer of a thin dielectric material, that reflects only the wavelength corresponding to the second incident light ray 180. In some embodiments, the first coating 190 is a collimating coating. The outer edge 90 is covered by a second coating 200, comprised of a material that may be similar to the first coating 190 and which reflects only the wavelength corresponding to the first incident light ray 50. In some embodiments, the second coating 200 is a non-collimating coating. In some embodiments, the second coating 200 may be comprised of the same material as the first coating 190, but with a pattern applied to it.

In some embodiments, the first dielectric coating 190 reflects a first narrow band of light wave lengths between 560 nm and 520 nm. The second dielectric coating 200 reflects a second narrow band of light wavelengths between 700 nm and 635 nm. In this embodiment, the reflections would be red and green, respectively. In other embodiments, the first coating 190 and second coating 200 may reflect different wavelengths corresponding with different colors.

In some embodiments, there may be a third coating disposed on the outer surface of the lens 170. In this embodiment, the third coating may comprise an anti-reflective material.

The disk optical element 20 is coupled to the inner surface of the body via a frame 40 at a body-to-optic angle 210. The light source 30 is affixed to a mounting surface 220 that is in a recessed slot 230 of the body post 240 that extends away from the disk optical element 20 location towards the user's aiming eye 120.

In the embodiment shown in FIG. 1, when the user's aiming eye 120 is within an aiming volume 280 defined as a forward and rearward projection of the aiming area 260 along the aiming axis 130, a first visual indicator 290 corresponding to the reflection line 110 reflecting from the concave surface 80 appears. When the user's aiming eye 120 is in the non-aiming volume 300, defined as a forward and rearward projection of the non-aiming area 270 along the aiming axis 130, a second visual indicator 310 corresponding to the reflection line 110 reflecting from the outer edge 90 appears.

In an alternate embodiment shown in FIG. 2, all the features of the embodiment of FIG. 1 remain, except that the disk optical element 20 is replaced by a cylindrical optical element 320 with a central void 330 where the aiming volume 280 passes through the cylindrical optical element 320. In this embodiment, the disk optical element 30 comprises a ring 320 in which the inner surface of the disk optical element is a center cavity 330 of the ring 320. When the user's aiming eye 120 is in the aiming volume 280, no visual indicator appears since the second incident light ray 180 passes directly through the central void 330. In this embodiment, only the second dielectric coating 200 is disposed as the first dielectric coating 190 would be located where the central void 320 of the ring shaped disk optical element 20 is.

Figure 6:
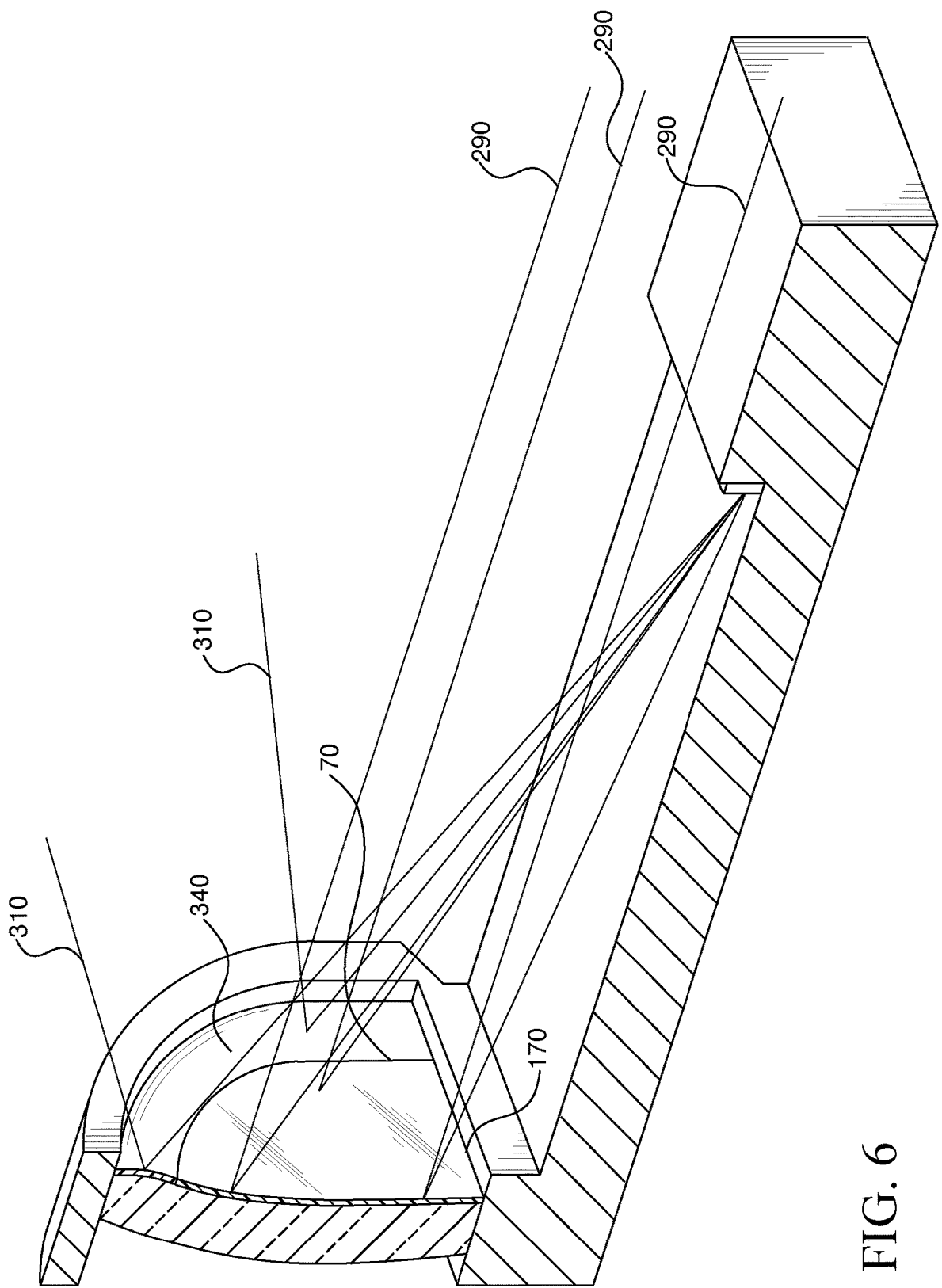
FIG. 6 depicts an isometric cross-section of a sighting device with a parabolic optical element.

In an alternate embodiment shown in FIG. 6, a partial disk optical element 340 and transition line 70 are configured such that the outer edge 90 section of the user-facing surface 60 forms a U-shape, instead of a ring shape. This represents that the outer edge 90 need not fully encircle the concave surface 80, creating a parabolic disk optical element.

Figure 7:
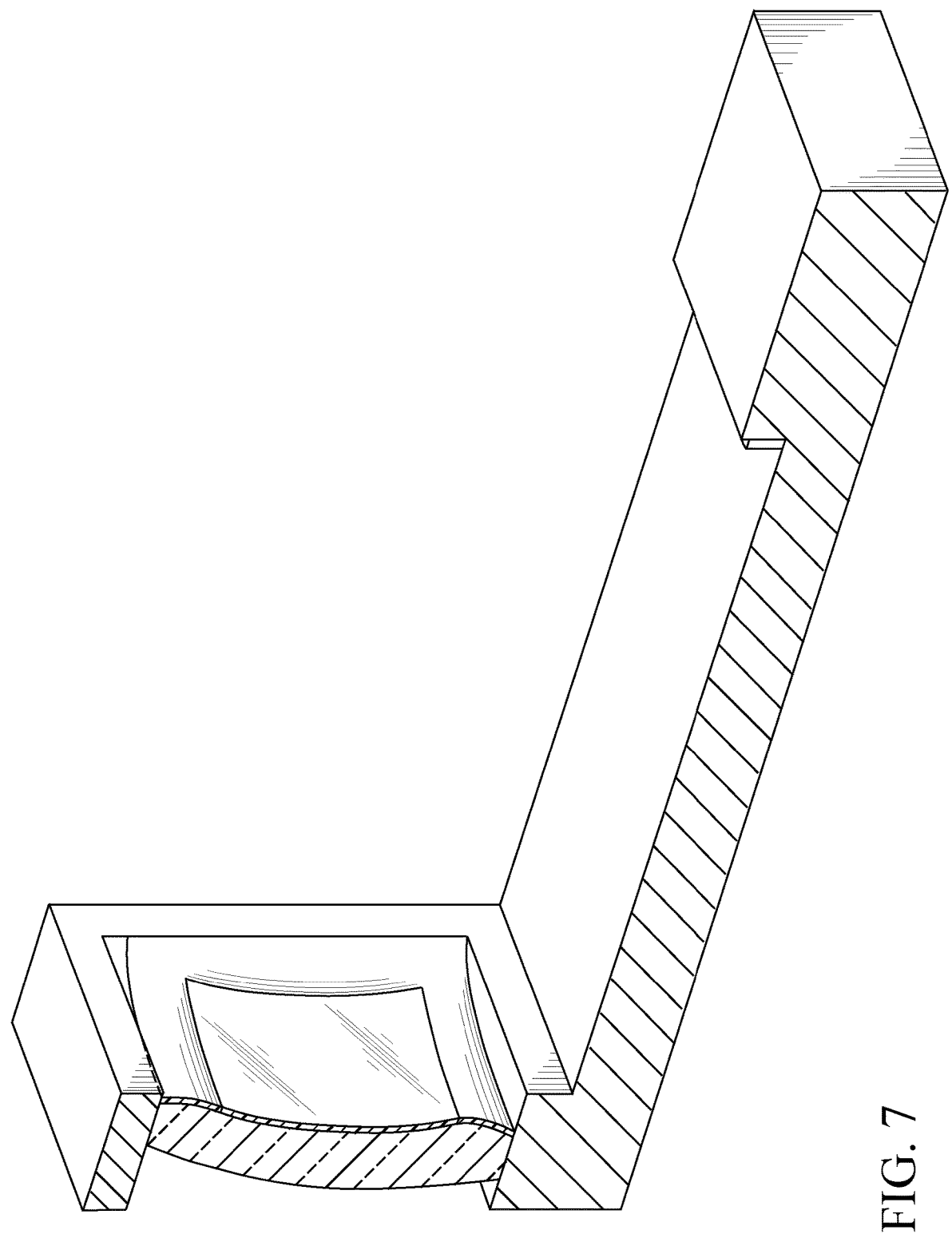
FIG. 7 depicts an isometric cross-section of a sighting device with a rectangular optical element.

In alternate embodiment shown in FIG. 7, the disk optical element 20 is a rectangle instead of a circle. This represents the flexibility of the invention with respect to altering the shape of the disk optical element 20 and the corresponding structure of the body 30, The disk optical element 20 may comprise other shapes such as by non-limiting example, quadrilaterals, trapezoids, parabolas, or regular polygons.

Figure 8:
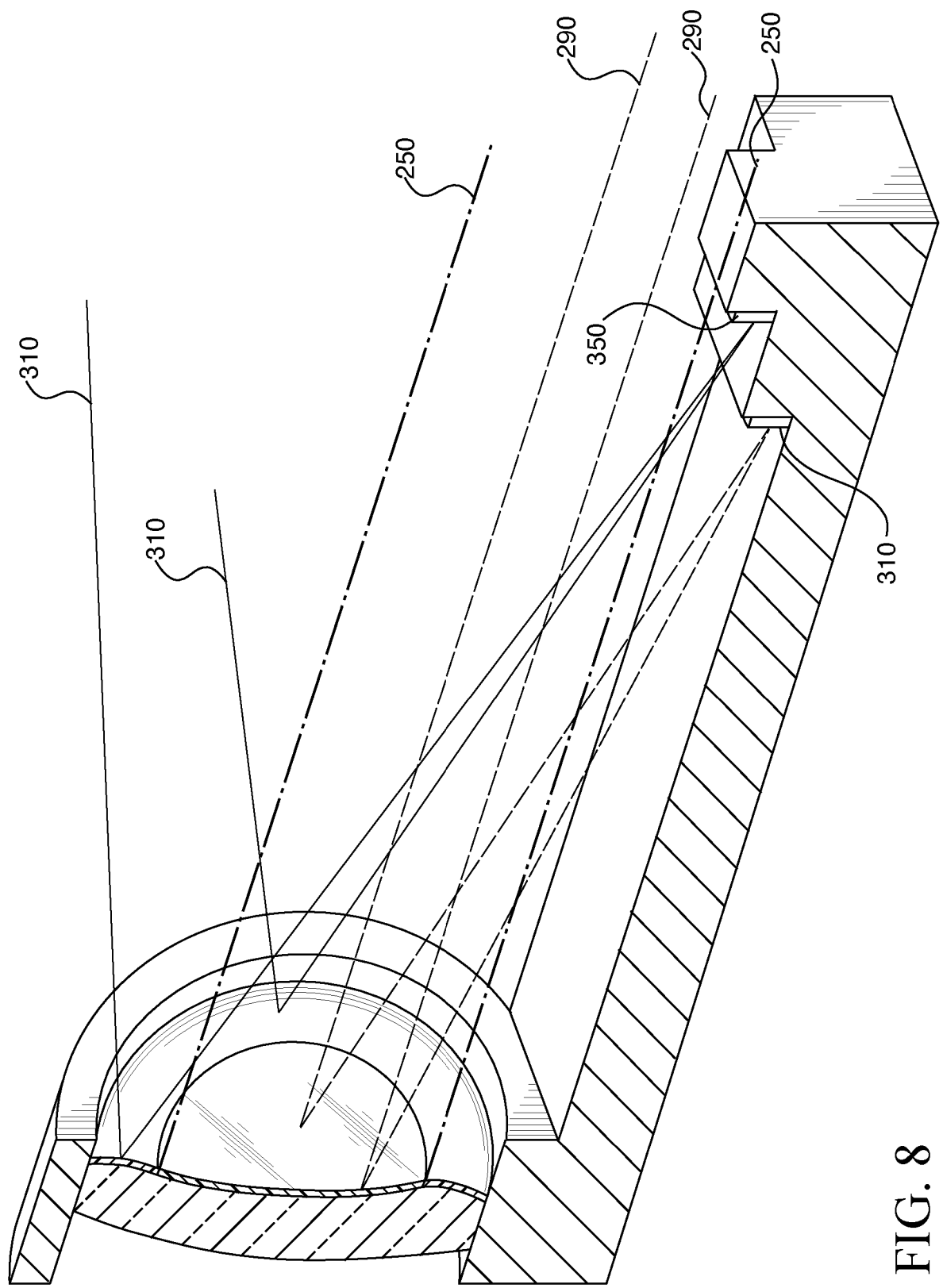
FIG. 8 depicts an isometric cross-section of a sighting device with two single wavelength light sources.

In an alternate embodiment shown in FIG. 8, an additional light source 350 is affixed to the body 30. In this embodiment, two single wavelength LEDS match a first narrow band of light wavelength from the first dielectric film, and a second narrow band of light wavelength from the second dielectric film, respectively.

Figure 9:
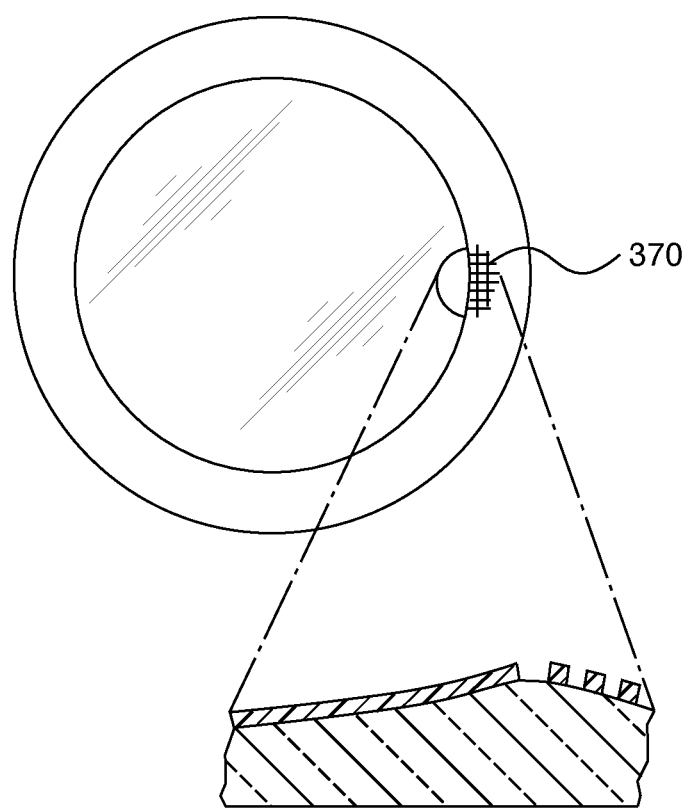
FIG. 9 depicts a front view of a sighting device with the second coating of the optical element cross-hatched/patterned.

In an alternate embodiment shown in FIG. 9, the second coating 200 is cross-hatched so that there are alternating lines of the second coating 200 and the bare user-facing surface 60. This creates an additional visual pattern 370 for the user's aiming eye 120 when viewing the non-aiming volume 300.

Figure 10:
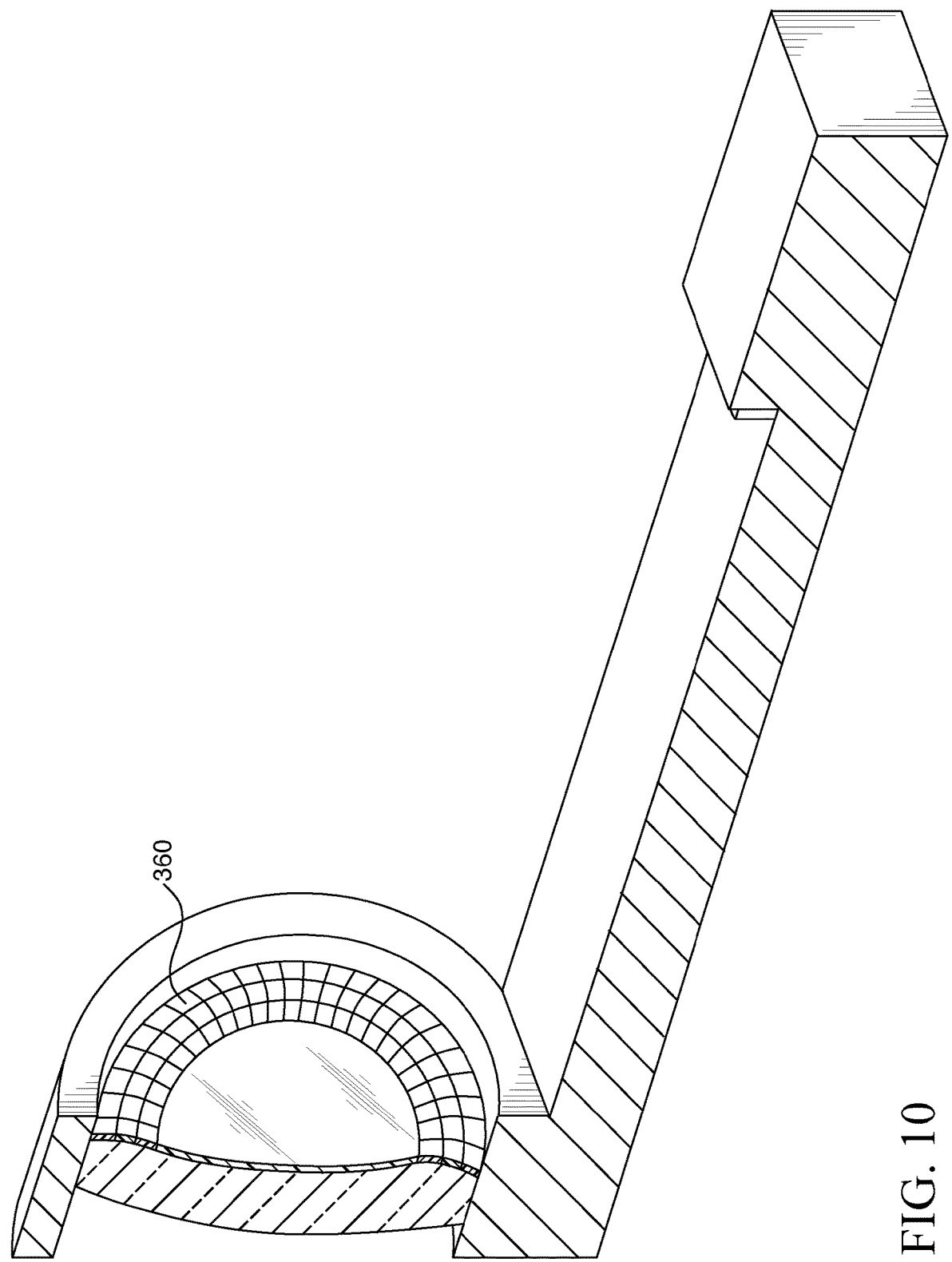
FIG. 10 depicts an isometric cross-section of a sighting device in which disk optical element is assembled from several disk optical sub-elements.

In an alternate embodiment shown in FIG. 10, the disk optical element 20 is assembled from several disk optical sub-elements 360.

It will also be understood that the size, shape, and other aspects of the structures themselves may vary somewhat from the preferred embodiment that is illustrated, so long as they perform the requisite functions.

It is therefore to be recognized that these and various other alterations, modifications, and/or additions may be introduced into the constructions and arrangements of parts described above without departing from the spirit or ambit of the present invention as defined by the claims.

I claim:

1. A method of manufacturing a sighting device to assist a shooter in aiming at a target, the method comprising:
   creating a disk optical element comprising a concave surface by grinding an optical material;
   reducing a curvature of an outer edge of the concave surface to less than that of the concave surface by further grinding the outer edge;
   coating an inner concave surface of the disk optical element with a first coating comprising a first dielectric film reflecting a first narrow band of light wavelengths;
   coating the outer edge of the concave surface of the disk optical element with a second coating comprising a second dielectric film reflecting a second narrow band of light wavelengths;
   housing the disk optical element within a frame body; and
   providing a dual wavelength LED located at a focal point of the disk optical element wherein an emission of light from the LED faces the disk optical element, wherein the dual wavelengths match the first and second narrow band of light wavelengths from the first and second dielectric films, respectively.

2. The method of manufacturing a sighting device to assist a shooter in aiming at a target of claim 1, the method further comprising:
   creating a spherical disk optical element by grinding the optical material.

3. The method of manufacturing a sighting device to assist a shooter in aiming at a target of claim 1, the method further comprising:
   creating a parabolic disk optical element by grinding the optical material.

4. The method of manufacturing a sighting device to assist a shooter in aiming at a target of claim 1, the method further comprising:
   coating a convex surface of the disk optical element with a third coating, wherein the third coating comprises an anti-reflective material.

5. The method of manufacturing a sighting device to assist a shooter in aiming at a target of claim 1, wherein:
   the first dielectric coating reflects a first narrow band of light wavelengths between 560 nm and 520 nm.

6. The method of manufacturing a sighting device to assist a shooter aiming at a target of claim 1, wherein:
   the second dielectric coating reflects a second narrow band of light wavelengths between 700 nm and 635 nm.

7. A sighting device to assist a shooter in aiming at a target, the sighting device comprising:
   a disk optical element comprising an outer edge, the outer edge comprising:
      a transition line;
      a user-facing edge; and
      a non-collimating contoured surface extending between the transition line and the user-facing edge, wherein the non-collimating contoured surface includes a first, coating disposed thereon and wherein the contoured surface is configured to reflect light at a divergence angle that varies from the transition line to the user-facing edge;
   a frame housing coupled to the disk optical element; and
   a light source configured to emit light towards the disk optical element.

8. The sighting device to assist a shooter in aiming at a target of claim 7, wherein:
   the disk optical element further comprises:
   a concave surface disposed proximal to the transition line of the outer edge, the concave surface comprising:
      a collimating contoured surface; and
      a second coating disposed on the collimating contoured surface.

9. The sighting device to assist a shooter in aiming at a target of claim 8, wherein:
   the first coating is patterned.

10. The sighting device to assist a shooter in aiming at a target of claim 8, wherein:
    the light source comprises a dual wavelength LED;
    the first coating comprises a first dielectric film;
    the second coating comprises a second dielectric film; and
    the dual wavelengths of the LED match a first and a second narrow band of light wavelengths from the first and the second dielectric films, respectively.

11. The sighting device to assist a shooter in aiming at a target of claim 10, wherein:
    the second narrow band of light wavelengths is within a range of 560 nm to 520 nm.

12. The sighting device to assist a shooter in aiming at a target of claim 10, wherein:
   the first narrow band of light wavelengths is within a range of 700 nm to 635 nm.

13. The sighting device to assist a shooter in aiming at a target of claim 8, wherein:
   the light source comprises a first single wavelength LED and a second single wavelength LED;
   the first coating comprises a first dielectric film;
   the second coating comprises a second dielectric film;
   the wavelengths of the first single wavelength LED match a first narrow band of light wavelengths from the first dielectric film; and
   the wavelengths of the second single wavelength LED match a second narrow band of light wavelengths from the second dielectric film.

14. The sighting device to assist a shooter in aiming at a target of claim 8, wherein: the light source comprises a fiber optic light collector.

15. The sighting device to assist a shooter in aiming at a target of claim 7, wherein:
   the outer edge forms a U-shape.

16. The sighting device to assist a shooter in aiming at a target of claim 7, further comprising:
   a third coating disposed on a surface of the outer edge that is substantially opposite from the non-collimating contoured surface, wherein the third coating comprises an anti-reflective material.

17. The sighting device to assist a shooter in aiming at a target of claim 7, wherein:
   the divergence angle increases from the transition line to the user-facing edge.

18. A method of manufacturing a sighting device to assist a shooter in aiming at a target, the method comprising:
   creating an optical element with a concave surface by grinding an optical material, wherein the optical element is a ring;
   reducing a curvature of the ring to less than that of the original concave surface by further grinding the ring;
   coating the ring with a dielectric film reflecting a narrow band of light wavelengths;
   housing the disk optical element within a frame body; and
   providing a light source located at a focal point of the optical element wherein the emission of light from the light source faces the optical element, and wherein a wavelength of the light matches the narrow band of light wavelength from the dielectric film.

19. A sighting device to assist a shooter in aiming at a target comprising:
   an optical element with a concave surface, wherein the optical element is a ring;
   wherein the ring includes a coating comprising a dielectric film reflecting a narrow band of light wavelengths;
   wherein the optical element is housed within a body; and
   a light source located at a focal point of the optical element in a direction where the light source faces the optical element, and wherein a wavelength of light from the light source matches the narrow band of light wavelength from the dielectric film.

\* \* \* \* \*